United States Patent
Sheikh-Movahhed et al.

(10) Patent No.: US 8,099,071 B2
(45) Date of Patent: Jan. 17, 2012

(54) DIRECT CONVERSION PRE-ADC FREQUENCY MIXER

(75) Inventors: Mohammad-Reza Sheikh-Movahhed, Ann Arbor, MI (US); Shaun David Kalinowski, Van Buren Township, MI (US); J. William Whikehart, Milford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 530 days.

(21) Appl. No.: 12/335,869

(22) Filed: Dec. 16, 2008

(65) Prior Publication Data

US 2010/0151811 A1   Jun. 17, 2010

(51) Int. Cl.
*H04B 1/06* (2006.01)

(52) U.S. Cl. .................. 455/272; 455/273

(58) Field of Classification Search .............. 375/316, 375/75; 455/137, 139, 273, 275, 276.1, 293, 455/272

See application file for complete search history.

(56) References Cited

U.S. PATENT DOCUMENTS

| | | | |
|---|---|---|---|
| 5,758,266 A | 5/1998 | Kornfeld et al. | |
| 6,385,262 B1 * | 5/2002 | Gustafsson et al. | 375/350 |
| 6,654,595 B1 | 11/2003 | Dexter | |
| 6,658,070 B1 | 12/2003 | Domokos | |
| 6,922,449 B1 * | 7/2005 | Bristow | 375/316 |
| 7,200,377 B2 | 4/2007 | Whikehart et al. | |
| 7,386,290 B2 | 6/2008 | Li et al. | |
| 7,392,024 B2 | 6/2008 | Suematsu et al. | |
| 2005/0117664 A1 | 6/2005 | Adan et al. | |
| 2005/0215213 A1 | 9/2005 | Toporski | |
| 2007/0019758 A1 * | 1/2007 | Haque et al. | 375/316 |

* cited by examiner

*Primary Examiner* — Brian Young
(74) *Attorney, Agent, or Firm* — Dickinson Wright PLLC (57) ABSTRACT

A system for single path processing identical, substantially identical, close or interfering frequencies with a single analog-to-digital converter. The system receives a plurality of input signals at various frequencies and front end circuits filter out first and second frequencies. A mixer and a front end oscillator are in communication with one of the front end circuits for mixing a front end frequency with one of the first and second frequencies prior to the analog-to-digital converter. A summer combines the output of the mixer with the output of one of the front end circuits. An analog-to-digital converter is connected to the summer for converting the analog input signal to a digital output signal. The first and second frequencies may be separately processed after they have been combined, even if they were identical frequencies.

27 Claims, 5 Drawing Sheets

FREQUENCY SPECTRUM ON ANTENNA 1

FREQUENCY SPECTRUM ON ANTENNA 2

FREQUENCY SPECTRUM AT RF ADC INPUT

Fig. 5

DIRECT CONVERSION PRE-ADC FREQUENCY MIXER

BACKGROUND OF THE INVENTION

1. Field of the Invention

The present invention relates to a system and method for processing different signals on separate channels of identical, substantially identical, and close frequencies.

2. Description of the Prior Art

In direct conversion receiver designs, many receivers use multiple analog-to-digital converters to convert input frequencies while others use one analog-to-digital converter. In receivers with only one analog-to-digital converter, when two or more close or identical frequencies are processed, they may destructively combine, interfere with each other, or be indistinguishable from each other. In other words, the frequencies may combine and interfere with each other and thus not be able to be fully recovered later, and more importantly, may negatively affect the quality of the audio output to the user. This interference is especially problematic with identical frequencies, such as 95.5 and 95.5 or substantially identical frequencies, such as 95.5 and 95.7, and at times, close frequencies such as 95.5 MHz and 97.5 MHz. To avoid interference, some systems use two separate tuners and process each frequency separately, which may substantially increase the product cost.

Most existing receivers include at least one antenna capable of receiving a plurality of input signals at various frequencies. A first front end circuit and a second front end circuit is typically connected to the antenna. The first front end circuit filters out a first frequency received by the antenna, such that the first front end circuit filters all received frequencies and only outputs essentially the first frequency. The second front end circuit filters out a second frequency received by the antenna, such that the second front end circuit filters all received frequencies and only outputs essentially the second frequency. The first front end circuit provides the filtered out first frequency for processing along a first path, and the second front end circuit provides the filtered out second frequency for processing along a second path. More specifically, the front end circuits when providing a filtered out frequency generally provide a signal centered approximately in the desired filtered out frequency. The receivers also include an analog-to-digital converter connected to each of the front end circuits. If more than one front end circuit is included, typically more than one analog-to-digital converter is also included, which substantially increases the receiver cost and dramatically adds to the physical size required.

SUMMARY OF THE INVENTION AND ADVANTAGES

The present invention is directed to a system and method for processing different signals of identical, substantially identical or close frequencies while minimizing interference between the frequencies, and improving, (1) output signal quality, (2) the process and integrity of the data collection on each and every frequency within each band of interest.

A front end oscillator and mixer is disposed serially between the second front end circuit and the summer for mixing a front end frequency with a selected frequency prior to the analog-to-digital converter to deliver a converted frequency to the summer. The system requires only a single analog-to-digital converter and a single digital down converter to process multiple frequencies prior to entering the digital signal processor. The two identical, or constructively or destructively close frequencies, with one of the two frequencies including an additional frequency, are now far enough apart that any interference is minimized.

The system may include at least two antennas for receiving various frequencies. To improve the quality of the output to the user, such as an audio and visual output, the antennas may be located physically apart, known in the industry as space diversity of the antennas. When the antennas are spaced apart, they may receive different qualities of signal at the frequency selected by the user. Each antenna on the system would be in communication with a separate front end circuit, such that the first antenna is in communication with a first front end circuit and the second antenna is in communication with a second front end circuit. Of course, the system may include additional antennas and additional associated front end circuits. The system then uses the front end circuits to filter out substantially identical frequencies related to the frequency selected by the user. The system includes a mixer that moves the frequency or center of frequency of one of the signals output by one of the front end circuits to form a converted frequency or signal, such as the illustrated second front end circuit in the Figures. The original frequency or signal, such as provided by the first front end circuit is then input along with the converted frequency or signal into a summer. The summer combines the original and converted frequencies or signals into a single output signal that is input into the analog-to-digital converter. The analog-to-digital converter processes the input signal to create a digital output signal. As the frequencies filtered out by the front end circuits are identical or essentially identical, when combined they would normally be indistinguishable and inseparable after processing. By moving the signal from one of the front end circuits with the mixer, the signals may remain distinct within a single signal and may be processed with single analog-to-digital converter providing a cost savings in the manufacturing the system.

Figure 1:
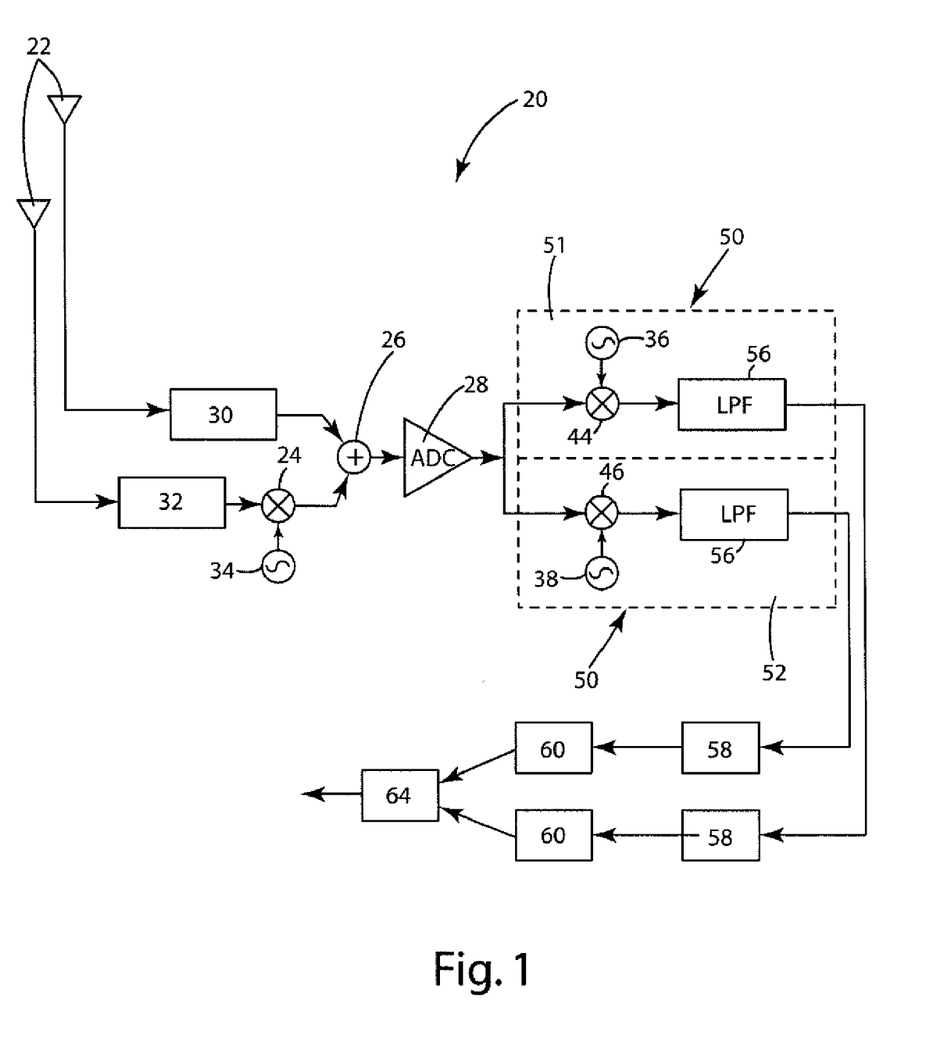
FIG. 1 is a schematic drawing of the system including two antennas with two demodulators.

The system then outputs the signal from the analog-to-digital converter into two digital down converters. The digital-down converters then further process the signal, with one separating out and processing the original signal, and the other separating out and processing the converted signal or frequency. In a first exemplary system, each digital down converter includes a mixer and may include optional filters, such as low-pass filter (LPF) and other filters. The system processes the signal and preferably moves it to be nominally centered about 0 Hz. The digital-down converter then outputs a signal, which may optionally further filtered as illustrated in the Figures. In the first embodiment, as illustrated in FIG. 1, each signal is then further output into a separate demodulator. Each demodulator recovers the original modulated signal in a form that may be audibly or visually output to the user. The system selects which of the two signals output from the demodulators provides the highest quality signal. The selected signal of course may be further processed before being finally output to the user. The system uses the highest quality signal to provide increased quality of output to the user and may quickly and seamlessly switch between signals without the user noticing the switch. For example, when a vehicle is at a stop light, one of the antennas may receive a weaker or lower quality signal, and the system would choose the higher quality signal to be output to the user. As the vehicle moves forward, the highest quality of signal may switch between the antennas and the system would also quickly switch the selected input.

The system may instead take the output of the digital-down converters and combine the signals using a phase combining technique into a single signal. The phase combination essentially lines up the signals, so that they are both at the same phase and same frequency for the highest quality of combination of the signals. The phase combination may also misalign as much as possible the two signals to cancel out an interfering signal that interferes with the frequency originally selected by the user. The system would then as described above input the signal into a demodulator for further processing.

The present invention allows the system to view close or substantially identical frequencies to the frequency selected by the user of the system. More specifically, this allows the system to view these close or substantially identical frequencies with minimal interference and in particular minimal interference with the frequency selected by the user, which is typically being output in a visual or audio form to the user. By allowing the system to view close or substantially identical frequencies, the system may improve the output quality of the frequency selected by the user. For example, by looking at close or substantially identical frequencies, the system may determine that a strong interfering signal is present and modify or adjust filters on the customer selected frequency to improve the output quality to the user.

The present invention allows the system to view close or substantially identical frequencies to the frequency selected by the user of the system. More specifically, this allows the system to view close or substantially identical frequencies to minimize interference. By allowing the system to view and collect data on close or substantially identical frequencies, the system may improve the output quality of the frequency selected by the user. For example, by looking at close or substantially identical frequencies, the system may determine that a strong interfering signal, strong desired, and or a weak desired is present. The system will then improve the quality of the desired signal that was selected by the user by dynamically applying one or more different techniques to the front end of the desired signal. More specifically, the system can (1) apply different bandwidths to the bandwidth setting of the front end circuit outputting the desired signal; (2) shift the filter in the front-end circuit so the front end circuit can pass most of the spectral content of the desired signal, but minimize the spectral content passed from an interfering signal; (3) use separate paths for the signal with each having its own gain control, and through use of the mixer on one of the desired and interfering signals and summer, allowing combined processing of the desired and interfering signal by the analog-to-digital converter, thereby allowing later determination of characteristics of the interfering frequency, which further allows for improved processing of the desired frequency, including adjusting bandwidth on the desired signal, or shifting center of frequency of the desired signal.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 2:
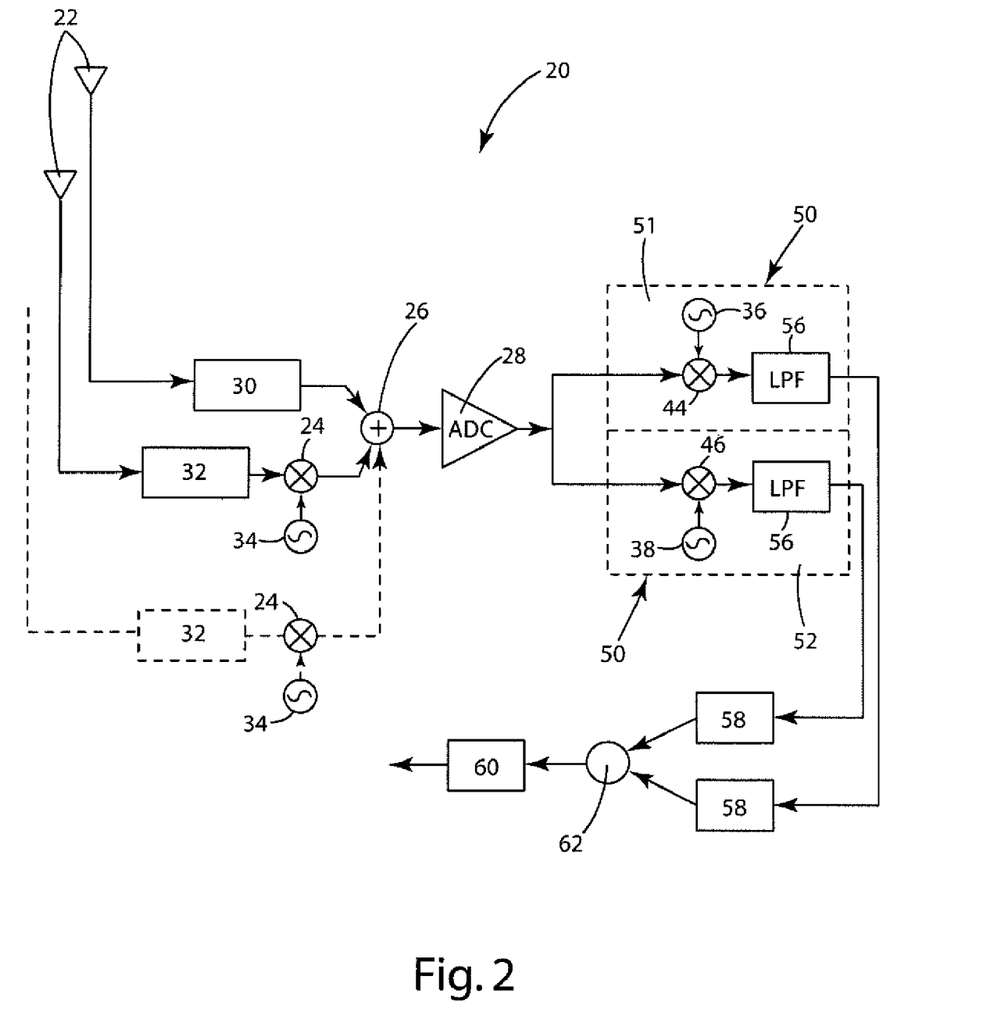
FIG. 2 is a schematic drawing of the system including two antennas with a phase combination and only one demodulator.
Figure 3:
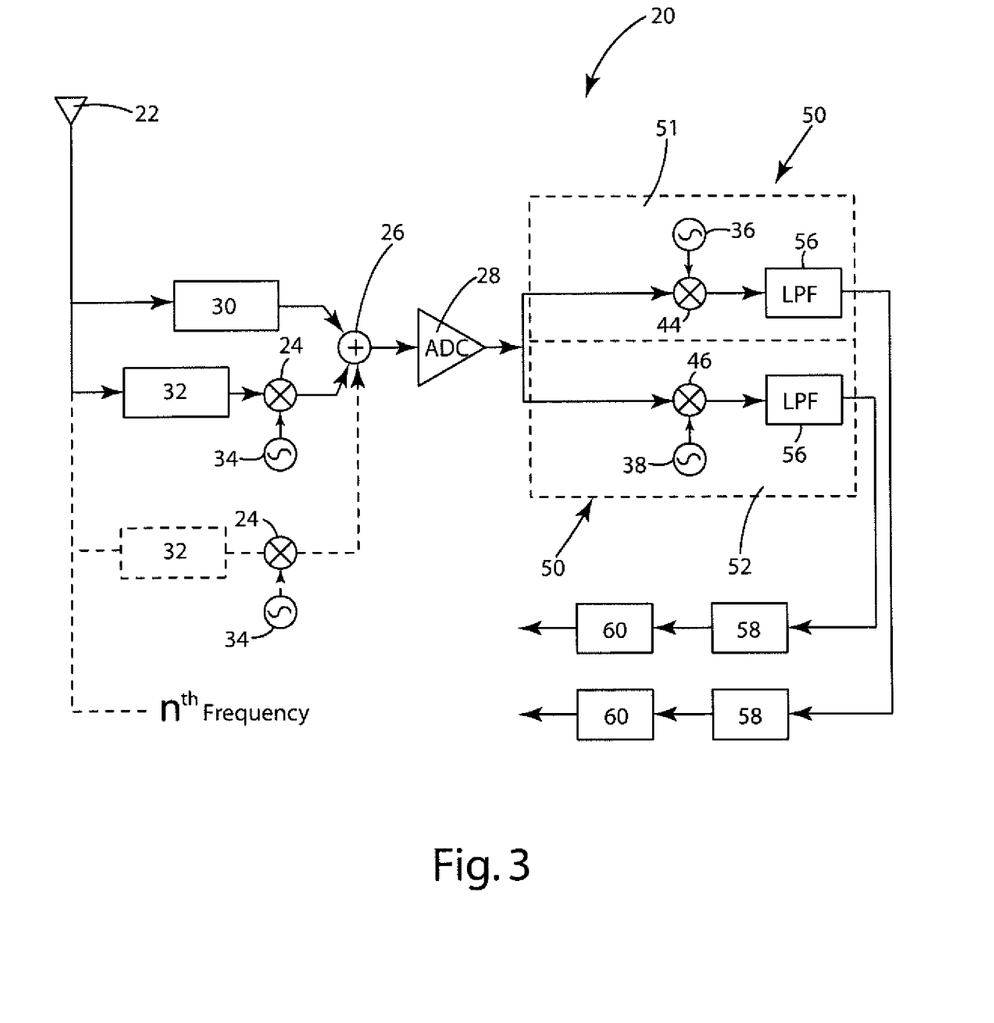
FIG. 3 is a schematic drawing of the system including one antenna.

Referring to the Figures, wherein like numerals indicate corresponding parts throughout the several views, a system 20 is generally shown for processing different signals on separate channels of identical and close frequencies substantially identical in FIGS. 1-3. These signals may include AM frequencies, FM frequencies, radio signals, television signals, satellite feeds, weather feeds, and any other desirable feeds.

In general, the system 20 will be described below as a receiver capable of receiving radio signals. The system 20 is in communication with or includes at least one antenna 22 for receiving a plurality of input signals at various frequencies as discussed in greater detail below. The system 20 includes at least two front end circuits in communication with the antenna(s) 22. The system 20 includes a mixer 24 for mixing an input frequency with a selected frequency. The selected frequency is selected from a frequency that is clean or free from interference, or may be a frequency generated by the system. When the mixer 24 mixes the input frequency with the selected frequency, it changes or shifts frequency by the difference or sum between the desired input frequency and the selected input frequency to create a converted frequency. A summer 26 typically combines at least one of the first and second input frequencies with the converted frequency or signal to form a combined analog frequency. A single analog-to-digital converter 28 and digital down converters 50 are disposed in series and convert the analog frequency. Additional processing options may be included, such as the illustrated filters 56, 58 and the demodulator 60.

The antenna 22 may be a wand type antenna 22, a window antenna 22, a satellite antenna 22, a wire antenna 22, and any other antenna 22 known in the art or used in the future. The system 20 is in communication with or includes at least one antenna 22 for receiving a plurality of signals as shown in FIG. 3. The system 20 may be in communication with or include more than one antenna 22 for receiving the signals as illustrated in FIGS. 1 and 2. One advantage to using multiple antennas in a vehicle is that it allows for spatial diversity. In some environments, particularly hilly, mountainous, or urban areas, the quality of signal at a particular desired frequency may vary substantially with minor spatial movements. For example, a vehicle with a single antenna may experience fade in or out as well as variations in interference with minor movements while being substantially stopped at a stop light. By placing the antennas spatially apart on the vehicle, the system 10 with multiple antennas 22 may reduce this problem.

The system 20 includes at least two front end circuits 30, 32. More specifically, as illustrated in the Figures, the first front end circuit 30 may be in communication with a first antenna 22 while a second front end circuit 32 may be in communication with a second antenna 22. Of course, as illustrated in FIG. 3, the front end circuits may be coupled to a single antenna 22. The front end circuits 30, 32 filter out the frequencies received by the antenna 22. The front end circuits 30, 32 are typically set to filter out a frequency based upon an input of a desired frequency by a user. The system 20 uses the first front end circuit to filter out a first frequency and the second front end circuit 32 to filter out a second frequency. The second frequency may be identical to the first frequency. As illustrated in phantom lines in FIGS. 2 and 3, the system 20 may receive more than two signals, and therefore have a plurality of front end circuits for filtering out multiple frequencies, selected from the frequencies received by the antenna(s) 22. The front end circuits 30, 32 may be formed as a single circuit, or as illustrated in the Figures may be formed from separate circuits. Each front end circuit 30, 32 provides and filters a frequency output or signal output from the signals of frequencies received by the antenna 22 and communicated to the front end circuits 30, 32.

As illustrated, the mixer 24 is in communication with and responsive to at least one of the front end circuits 30, 32 and is illustrated in the Figures as being in communication with the second front end circuit 32. An oscillator 34 is in communication with the mixer 24. The oscillator 34 sends a signal to the mixer 24, referred to herein as a selected input frequency. The oscillator 34 may generate the frequency provided to the mixer 24, or in some embodiments (not illustrated), a clean frequency received by the antenna 22 may be provided to the mixer 24. A clean frequency is substantially free of content and interference. The mixer 24 mixes the selected input frequency with the frequency or signal provided by the front end circuit to produce a converted frequency. As illustrated in the Figures, the mixer 24 is in communication with the second front end circuit, and mixes the second frequency or signal with the selected frequency or signal to crate a converted frequency or signal. The first front end frequency is typically determined by an input from the user. Different countries use different frequency bands, and thus the front end frequency will be in correlation to the location of the user and settings of the processor.

The summer 26 is in communication with the mixer 24 and one of the front end circuits, illustrated in the Figures as the first front end circuit 30, and combines the first input frequency from the first front end circuit 30 and converted frequency from the mixer 24 into a combined analog frequency or signal. If there are more than two front end circuits 30, 32, the summer 26 may be connected to all of the front end circuits and combine all of the frequencies from the front end circuits and mixer into the analog frequency or signal.

The single analog-to-digital converter 28 is connected to the summer 26 for converting the analog frequency or signal to a digital frequency or signal. Thus, the converted frequency or signal and the first frequency or signal are capable of being processed by the same analog-to-digital converter 28. This combined processing is possible for identical or close frequencies due to mixer 24 moving one of the frequencies, such that when combined, they do not interfere with each other and they may later be distinguished for separate processing.

For example, the first frequency is 97.5 MHz and the second frequency is an identical 97.5 MHz. If the oscillator 34 is set to 30 MHz and provides this signal to the mixer 24, the mixer 24 would mix the selected input frequency with the 30 MHz to create a converted down-shifted frequency of 67.5 MHz or a converted up-shifted frequency of 127.5 MHz. As illustrated in the exemplary Figures, the converted frequency then enters the summer 26 along with the first frequency. Thus, because the frequencies of the first frequency and the converted frequency are further apart, the frequencies will not interfere with each other. The system 20 upon noticing any interference between the converted and input frequency will shift the selected frequency, such that the converted frequency is shifted until it no longer interferes with the input frequency. The system 20 may further include digital down converters 50 connected to the analog-to-digital converter 28 for converting the digital output frequency to a first down converted frequency and a second down converted frequency.

The digital down converters 50 generally include a processor mixer and a processor oscillator, respectfully illustrated as a first process or mixer 44 and first processor oscillator 36 in the first digital down converter 51 and a second processor mixer 46 and a second processor oscillator 38 in the second digital down converter 52. Although not illustrated, the system 20 may include additional digital down converter for processing additional frequencies.

In operation, the first processor oscillator 36 mixes a selected first frequency to the first down converted frequency, to generally move the resultant first frequency or signal to be centered about 0 Hz. The second processor oscillator 38 mixes a second selected frequency to the converted frequency to generally move the resultant converted frequency or signal to be centered about 0 Hz. More processor oscillators may be included, such as to look at additional frequencies or when more than two input frequencies are used.

The demodulators 60 are generally used to recover the original signals, and as illustrated in the Figures, a first demodulator for recovering the first frequency and a second demodulator for recovering the second frequency, which had been originally converted into the converted frequency from the original second signal or frequency.

Figure 4:
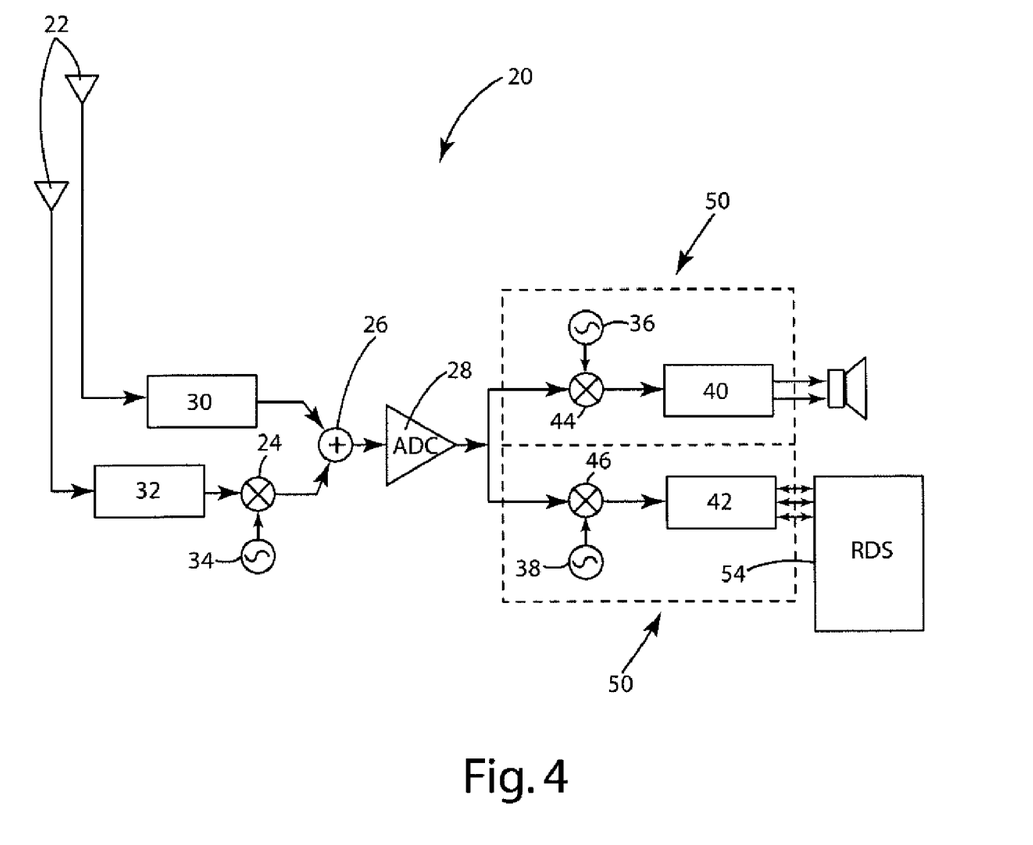
FIG. 4 is a schematic drawing of the system including a radio data system.
Figure 5:
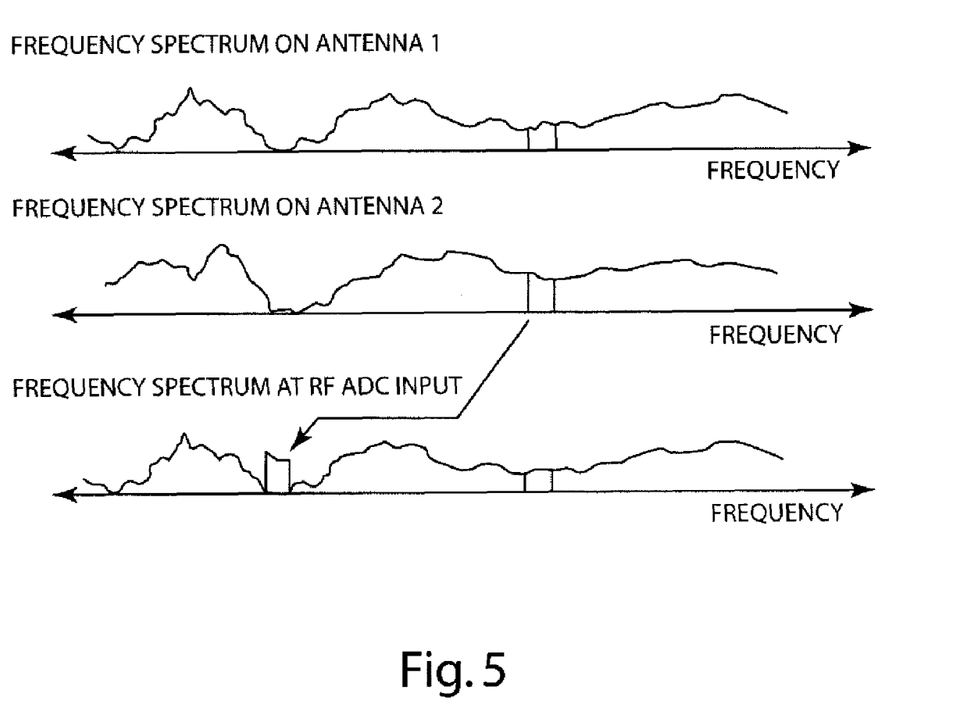
FIG. 5 is a plot of the frequency spectrums.

As illustrated in FIG. 4, the system 20 may include a radio data system 54 for collecting frequency spectrum data from all of the input signals. The system may also scan the data for a common unused frequency and set the front end selected frequency to the unused frequency. For example, if there is an unused and common frequency on both frequency spectrums of the input signals, the front end frequency may be set to that unused frequency, which is implemented by an algorithm.

The digital-down converters and demodulators essentially allow the original input signal to be recovered and thus allows the user to tune to a specific channel. The system 20 may also implement a sweep across the desired frequency band and a detect function. The detect function not only tunes to a frequency to determine that a signal is present but also determines specific features of a detected frequencies with the desired frequency band. As the system 20 performs a background search of a frequency band from activation and has existing stored information regarding specific frequencies within a frequency band, when the user seeks for another station, the system may pull from this stored information instead of performing a typical seek function. This allows the system to instantly jump without delay or minimal delay to the next channel or desired output by the user, and is typically much faster implementing the desired output than a seek or search function. This also in turns allows the user to easily search the radio by genre or other desired categories. Of course, the system 20 may implement a seek and scan function, initiated by the user.

As illustrated in FIG. 1, the system may include a low pass filter (LPF) 56 and other optional additional filters 58 for further processing of the signal. Many times these filters are part of the digital down converter or are arranged between the digital down converter and the demodulator. As illustrated in FIG. 1, the system 20 further includes a signal selector 64, which selects the highest quality signal from the available choices. This allows spatial diversity with the use of multiple antennas on a vehicle to select the highest quality signal.

As illustrated in FIG. 2, instead of using a signal selector 64, the system 20 may include a phase combination device 62 that aligns the frequency and phase of the two signals and then combines them into a single signal. The phase combine devices 62 will be located between the digital down converter and the demodulator 60. The use of a phase combine also allows for the use of a single demodulator.

Information from all frequencies on the frequency spectrum may be collected and stored for future use. The system may also implement band-mapping, where the collected information is used to provide the user with a list of listenable stations in the listener's geographic region, and where means is provided for the user to select a station from the list for listening. The collected information may be used for analysis of the desired channel, and for determining and removing adjacent channel interference. Note that it is not necessary that all of the invention steps (for example the single A/D converter) be accomplished to achieve the benefit of using an existing scanning function in the system for the additional purpose of reducing adjacent channel interference. Received data on the scanned channels may include electronic program guides that allow the user to view future content that can be selected for listening.

The present invention further includes a method for converting a plurality of identical, substantially identical frequencies, or close frequencies. The system 20 receives a plurality of input frequencies from an antenna 22 as described previously. The system 20 receives at least two frequencies, including a first frequency and a second frequency, but may receive more than two. The first and second frequencies may be filtered out by first and second front end circuits 30, 32. The second frequency is then mixed with a front end frequency to produce a converted frequency. This is facilitated by the use of the mixer 24 and the front end oscillator 34. The first and converted frequencies are then combined to produce an analog input frequency. This step is facilitated by the summer 26.

The analog input frequency is then converted to a digital output frequency facilitated by the analog-to-digital converter 28. The digital output frequency is converted to a first down converted frequency and a second down converted frequency. This step is enabled by the digital down converter 50.

Within the digital down converter 50, the first down converted frequency is mixed with a first selected frequency and the second down converted frequency is mixed with a second selected frequency. This step is facilitated by the processor mixers 44, 46 and processor oscillators 36, 38. The processor oscillators 36, 38 are adjusting the first and second down converted frequencies to begin recovering the first and second frequencies. This is further carried out by demodulating the first down converted frequency with the first demodulator 40 and demodulating the second down converted frequency with the second demodulator 42.

The radio data system 54 collects data from the input signals by scanning the frequencies for a common unused frequency on the first and second frequencies. As previously described, the front end frequency is set to the unused frequency to further avoid interferences.

As illustrated in FIG. 3, the system 20 may be implemented with a single antenna to allow the system 20 to have improved filtering through processing and seeing close frequencies or close interfering frequencies. Not only does the mixer 24 allow single path processing of identical frequencies, but also allows the system in a single processing path to analyze and store information on close, or interfering frequencies. The single path processing lowers system costs.

The forgoing discussion discloses and describes an exemplary embodiment of the present invention. Once skilled in the art will readily recognize from such discussion, and from the accompanying drawings and claims that various changes, modifications and variations can be made therein without departing from the true spirit and fair scope of the invention as defined by the following claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A system capable of receiving and processing of identical, substantially identical or close frequencies comprising;
   a first front end circuit capable of filtering out a first frequency;
   a second front end circuit capable of filtering out a second frequency;
   a mixer in communication with one of said first and second circuits and said mixer adding a selected frequency to one of said first and second frequencies to create a converted frequency;
   a summer connected to said front end circuits capable of combining one of said first and second frequencies with said converted frequency, said summer outputting a combined analog signal;
   an analog-to-digital converter connected to said summer capable of converting the analog signal from the summer to a digital signal; and
   a first digital down converter capable of processing said first frequency and a second digital down converter capable of processing said second frequency from said digital frequency.

2. A system as set forth in claim 1 wherein said mixer is disposed serially between said second front end circuit and said summer.

3. A system as set forth in claim 1 including at least two digital down converters connected to said analog-to-digital converter for down converting the digital output frequency to a first down converted frequency and a second down converted frequency.

4. A system as set forth in claim 3 wherein said digital down converters each include a mixer and oscillator for processing the digital signal into separate signals representative of the first and second frequencies.

5. A system as set forth in claim 1 further including channel scanning system for collecting frequency spectrum data from the input signals and scanning the data for a common unused frequency and setting an oscillator in communication with said mixer to a selected frequency essentially centered about said unused frequency.

6. A system as set forth in claim 1 wherein said system includes a first demodulator connected to said first digital down converter for recovering the first frequency.

7. A system as set forth in claim 1 wherein said digital signal processor includes a second demodulator connected to said second digital down converter for recovering the second frequency.

8. A system as set forth in claim 1 including at least one antenna for receiving a plurality of input signals at various frequencies and wherein said antenna is in communication with said front end circuits.

9. A system capable of receiving and processing of identical, substantially identical or close frequencies comprising;
   a first front end circuit capable of filtering out a first frequency;
   a second front end circuit capable of filtering out a second frequency;
   a mixer in communication with one of said first and second circuits and said mixer adding a selected frequency to one of said first and second frequencies to create a converted frequency;

a summer connected to said front end circuits capable of combining one of said first and second frequencies with said converted frequency, said summer outputting a combined analog signal;

an analog-to-digital converter connected to said summer capable of converting the analog signal from the summer to a digital signal; and a phase combination device capable of aligning the phases of the two signals and combining the signals into a single signal, and outputting the combined signal into a demodulator.

10. The system of claim 9 further including a digital down converter and a signal selector in communication with the digital down converter.

11. The system of claim 10 further including a demodulator in communication with the signal selector.

12. The system of claim 10 wherein said signal selector is capable of providing feedback to the front end circuits and wherein the front end circuits are capable of adjusting filtering of the received signals based upon said feedback.

13. A method for converting a plurality of identical, substantially identical and close frequencies comprising the steps of:

receiving a plurality of input frequencies including a first frequency and a second frequency;

mixing the second frequency with a selected frequency to produce a converted frequency;

combining the first frequency and the converted frequency to form an analog input signal processing the analog signal into a digital signal; and converting the digital signal to a first down converted frequency and a second down converted frequency.

14. A method as set forth in claim 13 further comprising the step of demodulating the first down converted frequency for recovering the first frequency.

15. A method as set forth in claim 13 further comprising the step of demodulating the second down converted frequency for recovering the second frequency.

16. A method as set forth in claim 13 further comprising the step of collecting frequency spectrum data from the input signals and scanning the data for a common unused frequency for use as the selected frequency.

17. A method as set forth in claim 13 wherein said receiving step includes filtering out the first and second frequencies.

18. The method of claim 13 further including the step of collecting frequency spectrum data.

19. The method of claim 18 further including the step of storing data related to individual frequencies with the collected frequency spectrum data.

20. The method of claim 19 further including the step of using said frequency spectrum data in response to a seek input.

21. The method of claim 18 including the step of using said collected frequency spectrum data to determine said selected frequency.

22. The method of claim 13 further including the step of selecting one of said first and second down converted frequencies and outputting said selected frequency to a demodulator.

23. The method of claim 13 further including a step of phase combining said first and second down converted frequencies and outputting said combined frequencies to a demodulator.

24. A system capable of receiving and processing difference signals on separate channels of the same and close frequencies comprising:

a first and second front end circuit for filtering out a first frequency and a second frequency, a mixer connected to one of said front end circuits, a front end oscillator in communication with said mixer for mixing a front end frequency with one of said first and second frequencies, and a radio data system for collecting frequency spectrum data from the first and second frequencies and scanning for a common unused frequency and setting the front end frequency to the unused frequency.

25. A system as set forth in claim 24 including a digital down converter for processing the first and second frequencies and the frequency spectrum data from said radio data system.

26. A system as set forth in claim 24 including a summer connected to at least one of said front end circuits and for combining one of said first and second frequencies with an output from the mixer into a combined analog signal.

27. A system as set forth in claim 26 including an analog-to-digital converter connected to said summer for converting the analog signal to a digital signal.

* * * * *